(12) United States Patent
Gupta et al.

(10) Patent No.: US 12,182,129 B2
(45) Date of Patent: Dec. 31, 2024

(54) METHODS AND SYSTEMS FOR DATA LEVERAGING

(71) Applicant: Bank of America Corporation, Charlotte, NC (US)

(72) Inventors: Nupur Gupta, London (GB); Harinath Meedinti Bhaskara Reddy, Charlotte, NC (US); Manu Kurian, Dallas, TX (US); Jayachandra Varma, Irvington, TX (US); Erica Perkins, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 18/198,863

(22) Filed: May 18, 2023

(65) Prior Publication Data

US 2024/0386021 A1   Nov. 21, 2024

(51) Int. Cl.
*G06F 16/2455* (2019.01)
*G06F 16/2453* (2019.01)
*G06N 5/022* (2023.01)
*G06N 10/60* (2022.01)

(52) U.S. Cl.
CPC .. *G06F 16/24564* (2019.01); *G06F 16/24542* (2019.01); *G06N 5/022* (2013.01); *G06N 10/60* (2022.01)

(58) Field of Classification Search
CPC ........ G06F 16/24564; G06F 16/24542; G06N 5/022; G06N 10/60
See application file for complete search history.

(56) References Cited

U.S. PATENT DOCUMENTS

| | | | |
|---|---|---|---|
| 2018/0316588 A1* | 11/2018 | Miernik | H04L 41/5019 |
| 2019/0095817 A1* | 3/2019 | Ma | H04L 67/10 |
| 2019/0129407 A1* | 5/2019 | Cella | G06N 3/006 |
| 2020/0026710 A1* | 1/2020 | Przada | G06F 16/254 |
| 2022/0014589 A1* | 1/2022 | Padiyar | H04L 67/561 |
| 2024/0193501 A1* | 6/2024 | Roberts | G06N 3/098 |

OTHER PUBLICATIONS

Bhatt, "Merge When Not Matched By Source" (https://learn.microsoft.com/en-us/answers/questions/179041/merge-when-not-matched-by-source) (Year: 2020).*

* cited by examiner

*Primary Examiner* — Etienne P Leroux
*Assistant Examiner* — Oscar Wehovz
(74) *Attorney, Agent, or Firm* — Weiss & Arons LLP

(57) ABSTRACT

A method for facilitating transfer of a new dataset across a network may include the following steps: (a) querying the global dataset via a computer processor to identify an existing dataset having data points corresponding to the new dataset; (b) identifying historical data rules previously used for a set of data transfers relating to the existing dataset; and (c) using the historical data rules to assist a machine learning engine in generating data rules for use with a data transfer relating to the new dataset.

15 Claims, 9 Drawing Sheets

METHODS AND SYSTEMS FOR DATA LEVERAGING

FIELD OF TECHNOLOGY

Aspects of the disclosure relate to optimization of data rules for applications such as data transfers.

BACKGROUND OF THE DISCLOSURE

Data rules are established and used, for example, to expedite and optimize various data manipulation activities, such as data transfers; testing and/or evaluating data quality, validating data, or establishing data integration requirements; and improving data integration. Machine learning and artificial intelligence technologies are being used to establish such data rules. However, the establishment of optimal data rules for recently received data sets can be a rate-limiting step, particularly for large institutions, for example financial institutions, that must intake, process, and integrate vast quantities of data on an ongoing basis.

Moreover, institutions may maintain a large database of programs and/or applications that assist in data processing or other manipulations, for example in banking transactions. With time, such programs and applications can be merged or replaced with other applications, which can affect data rules created or optimized for use with such applications and necessitate data rule modification.

Therefore, there exists a need for improved methods of data rule establishment and optimization.

SUMMARY OF THE DISCLOSURE

It is an object of this invention to facilitate data transfers across and within data networks.

It is a further object of this invention to streamline data rule optimization of datasets to which a network or computer processor is naïve.

A method in accordance with principles of the disclosure may be implemented by a computer and/or be automated.

A method in accordance with principles of the disclosure may utilize a computer processor and one or more non-transitory computer-readable media storing computer executable instructions. The instructions, when executed by the computer processor, may automatically search the global dataset and perform various other activities, as described herein.

A method in accordance with principles of the disclosure may facilitate transfer of a dataset across a network, for example in cases in which the network is exposed to the dataset for the first time. The new or newly received dataset may be also referred to as the "current dataset". The network may have access to a searchable global dataset or database.

A method for facilitating transfer of a new (current) dataset across a network, in accordance with principles of the disclosure, may include the following steps:
  querying the global dataset via a processing device or computer processor, to identify an existing dataset having one or more data patterns similar to the current dataset;
  identifying historical data rules (previously and/or currently) used for the existing dataset; and
  using the historical data rules to assist a machine learning engine in generating optimized data rules for use with a data transfer relating to the current dataset.

The historical data rules may have been previously used for data transfers relating to the existing dataset, for example, transferring the existing dataset, or a portion of the existing dataset, across, or within, a network.

By this method, transfer of the current dataset across the network may be facilitated, by leveraging historical datasets and data rules.

Embodiments of the system, as described herein, leverage artificial intelligence, machine-learning, and/or other complex, specific-use computer systems to provide a novel approach for establishing and optimizing data rules and facilitating data transfer operations. The system utilizes processors, which may include machine learning models, to match a new dataset with one or more existing datasets in a global database and/or generate and optimize data rules for a new dataset. The system may intelligently use data rules associated with the existing dataset(s) to facilitate identification and optimization of data rules for the new dataset.

As such, the present disclosure provides a technical solution to a technical problem of suboptimal data rules for facilitating transfer of large datasets within or across a network.

The present disclosure improves upon conventional approaches by providing a system for using machine learning (ML) models for optimizing data rules. The machine learning engine considers data rules from previous datasets similar to a new dataset.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
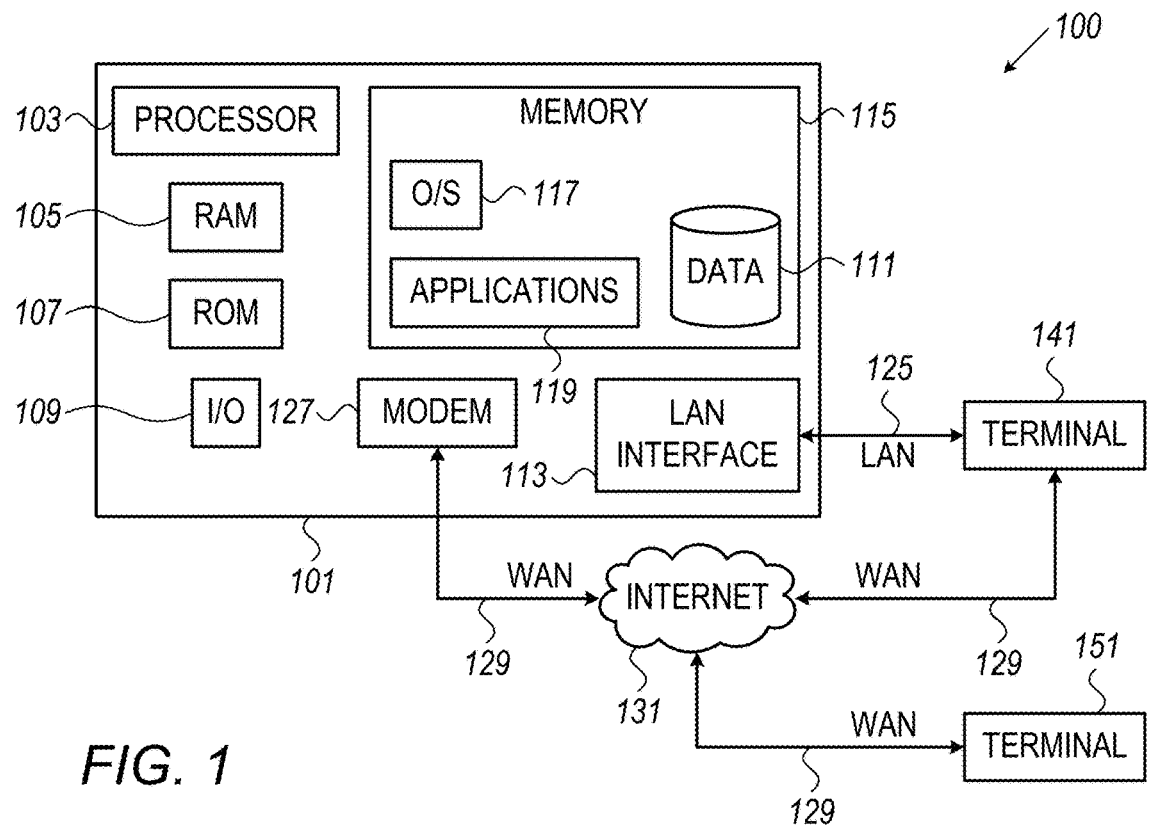
FIG. 1 shows an illustrative system in accordance with principles of the disclosure.

Systems and methods are described for leveraging artificial intelligence, machine-learning, and/or other complex, specific-use computer systems to provide a novel approach for optimizing data used for a new dataset, facilitating data transfers, and other data processing activities.

A method in accordance with principles of the disclosure may be implemented by a computer and/or be automated.

A method in accordance with principles of the disclosure may utilize a computer processor and one or more non-transitory computer-readable media storing computer executable instructions. The instructions, when executed by the computer processor, may automatically search the global dataset.

A method in accordance with principles of the disclosure may facilitate transfer of a dataset across a network, for example in cases in which the network is exposed to the dataset for the first time. The new or newly received dataset may be also referred to as the "current dataset". The network may have access to a searchable global dataset or database.

Reference herein to a global dataset may include, for example, a central database of an institution, non-limiting examples of which are financial institutions, commercial entities, insurance companies, retail franchises, and business-to-business or business-to-customer service providers. The global dataset may be a data mesh.

A method for facilitating transfer of a newly received (current) dataset across a network, in accordance with principles of the disclosure, may include the following steps:
    querying the global dataset via a processing device or computer processor, to identify an existing dataset having one or more data patterns similar to the current dataset;
    identifying historical data rules (currently or previously) used for the existing dataset; and
    using the historical data rules to assist a machine learning engine, system, or algorithm in generating and/or optimizing data rules for use with a data transfer relating to the current dataset.

In some aspects, the method also includes the subsequent step of transferring the current dataset to a recipient location, for example, using the optimized data rules.

In some aspects, newly-received or new, in reference to a dataset, refers to a dataset for which data rules have not yet been developed or formulated.

The historical data rules may have been previously used for the existing dataset. The historical data rules may have been previously used for data transfers relating to the existing dataset, for example, transferring the existing dataset, or a portion of the existing dataset, across, or within, a network.

The historical data rules may be currently used for the existing dataset. The historical data rules may be currently used for data transfers relating to the existing dataset, for example, transferring the existing dataset, or a portion of the existing dataset, across, or within, a network.

By this method, transfer of the current dataset across the network may be facilitated.

The described data rule optimization methods and systems may use various historical rules that did or did not work in order to create future rules. The data rules may access one or more applications that are used by an entity or institution and that may be referenced by an AIT (application inventory tool) Number. The applications may be relevant to any technology, e.g., a technology used in banking. As such, they can assist in data processing or any other banking technology.

Each application within an entity or institution, e.g., a financial institution, may receive an AIT number, which is a unique identifier for the application. The data rules may be updated when a first application is merged into a second application, and therefore the AIT number changes. Also, an application may change from a legacy application to an updated application. Such changes may be found in the AIT database, which may be accessible by any of the described data rule optimization/streamlining systems and methods. Such changes may result in, necessitate, or be relevant to data transfers from one location to another within a network.

In other aspects, a method for facilitating a transfer of a dataset between applications, across or within a network associated with an application database, in accordance with principles of the disclosure, may include the following steps:
    monitoring the application database to detect an event selected from: (i) merger of an original (first) application into a second, updated application; and (ii) changing an original application from a legacy application to an updated application;
    when said event is detected, searching for a (first) dataset(s) associated with the original application;
    querying the global dataset via a processing device or computer processor, to identify a second dataset associated with the updated application and having one or more data patterns similar to the first dataset;
    identifying historical data rules (currently or previously) used for the second dataset; and
    using the historical data rules to assist a machine learning engine, system, or algorithm in generating and/or optimizing data rules for transferring the first dataset from the original application to the updated application.

By this method, transfer of the current dataset across the network may be facilitated. The term "first" dataset in this context does not imply that the first dataset existed before the second. It is simply a term used for convenience, in describing the method.

In other aspects, a method for facilitating transfer of a newly received (current) dataset across a network, in accordance with principles of the disclosure, may include the following steps:
    querying the global dataset via a processing device or computer processor to identify an existing dataset having data points overlapping, or corresponding to, with the current dataset;
    identifying historical data rules (currently or previously) used for a set of data transfers relating to the existing dataset; and
    using the historical data rules to assist a machine learning engine, system, or algorithm in generating and/or optimizing data rules for use with a data transfer relating to the newly received dataset.

In some aspects, the method also includes the subsequent step of transferring the current dataset to a recipient location, for example using the optimized data rules. By this method, transfer of the newly received dataset across the network may be facilitated.

The mentioned data rules may access one or more applications that are used by an entity or institution and that may be referenced by an AIT (application inventory tool) Number. The data rules may be updated when a first application is merged into a second application or changes from a legacy application to an updated application. The AIT database may be accessible by any of the described optimization/streamlining systems and methods. Such changes may result in, necessitate, or be relevant to data transfers from one location to another within a network.

In other aspects, a method for facilitating a transfer of a dataset between applications, across or within a network associated with an application database, in accordance with principles of the disclosure, may include the following steps:

monitoring the application database to detect an event selected from: (i) merger of an original (first) application into a second, updated application; and (ii) changing an original application from a legacy application to an updated application;

when said event is detected, searching for a first dataset(s) associated with said original application;

querying the global dataset via a processing device or computer processor, to identify a second dataset associated with the updated application and having data points overlapping with, or corresponding to, the first dataset;

identifying historical data rules (currently or previously) used for the second dataset; and using the historical data rules to assist a machine learning engine in generating and/or optimizing data rules for transferring the first dataset from the original application to the updated application.

By this method, transfer of the current dataset across the network, e.g., by using the optimized data rules, may be facilitated.

Reference herein to similar data patterns may refer to datasets that reference the same customer or the same entity but contain, for example, different data fields as their data points. For example, the existing dataset may have identifying information about a customer, and the current dataset may contain information about his/her recent bank transactions, and the like. In another aspect, the datasets contain the same data fields for the same customer or entity, but relating to different timepoints. In some aspects, the data points are generally or entirely more updated in one of the datasets.

Similar data patterns may also refer to similar or the same data fields, for example lists of names, telephone numbers, email addresses, and the like, where the types of data fields are common to the existing and current datasets, even though the datasets may relate to different customers or entities.

Similar data patterns may also refer to datasets having similar levels of quality, similar levels of validation, similar levels of security clearance, similar degrees of encryption, similar architectures, or similar levels of complexity and organization.

Reference herein to overlapping data points or datasets may refer to datasets having common data points between the existing dataset and the current dataset, non-limiting examples of which are redundant data points, for example multiple copies of identifying information about the same customer or the same entity. In other instances, one or more of the datasets may have unique data fields not found in the other dataset.

As used herein, the term "entity" may be used to include any organization or collection of users that may interact with the described machine learning engine or system. An entity may refer to a business, company, or other organization that either maintains or operates the system or requests use and accesses the system. A non-limiting example of an entity is a financial institution. The terms "financial institution" and "financial entity" may be used to include any organization that processes financial transactions including, but not limited to, banks, credit unions, savings and loan associations, investment companies, stock brokerages, management firms, insurance companies and the like. In other aspects, an entity may be a business, organization, government branch, or the like that is not a financial institution. In some aspects, an entity may be a customer, e.g., a customer of a financial institution, such as a bank.

The aforementioned processing device or computer processor may be a computer, as described in more detail in FIG. 1, optionally including any of the components and elements described for FIG. 1.

Figure 2:
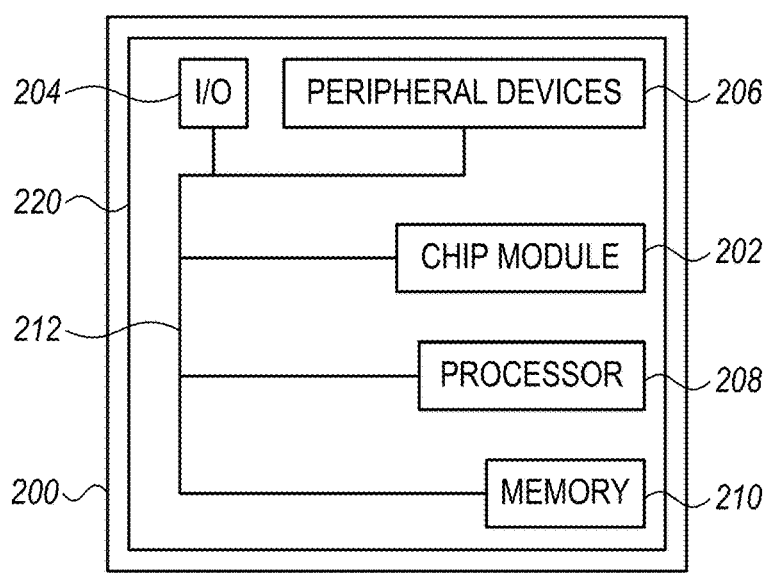
FIG. 2 shows an illustrative system in accordance with principles of the disclosure.

In some aspects, the processing device or computer processor may be a computer, as described in more detail in FIG. 2, optionally including any of the components and elements described for FIG. 2.

The processing device may be programmed to utilize clustering to identify existing dataset(s) having data points overlapping with the current dataset, or having data patterns similar to the current dataset. The processing device may utilize a similarity measure as a metric for ranking the relevance of existing datasets to the new dataset.

The processing device or computer processor may be programmed to identify more than one existing dataset having data points overlapping with the current dataset, or having data patterns similar to the current dataset, each with its own set of historical data rules. In any case, the machine learning algorithm or engine may attempt to use each of the historical data rule sets to assist it in generating data rules for the current (new) dataset. The machine learning algorithm or engine may begin training with the historical dataset deemed closest to the new dataset, followed by the second closest, etc. In some aspects, the machine learning algorithm or engine may begin training with the historical dataset deemed least similar among the similar datasets identified. The training may next proceed to the next dataset, with progressively greater degrees of similarity, until the dataset deemed the most similar is utilized.

The mentioned plurality of similar historical data sets may be used in parallel, for example by testing each set of historical data rules, to discern which is the most helpful in generating data rules for the new dataset. The plurality of historical data sets may be used iteratively, for example by first testing one set of historical data rules, to generate an initial set of data rules for the new dataset, then using a second set of historical data rules to guide potential improvements in the initial set of data rules. Whether or not improvements are obtained using the second set of historical data rules, the best data rules obtained may be used as a starting point for the next set of potential improvements, which may be guided by a third set of historical data rules, and so on.

The machine learning engine may be programmed to utilize the plurality of historical data rules to generate an initial set of data rules, followed by an improved or optimized set of data rules. Subsequently, the machine learning engine may tune the improved or optimized data rules, using (for example, via comparison with) the new dataset.

In some aspects, the machine learning engine may be programmed to utilize the new dataset to generate an initial set of data rules and subsequently tune the data rules using (for example, via comparison with) the plurality of historical data rule sets, for example either in parallel or iteratively, as described herein.

Ongoing potential improvements in a set of data rules may be continually tested by the machine learning algorithm or engine using the new dataset. Efficiency of transfer of the data, or a data sample, within or across the network, may be the benchmark for assessing improvements in the set of data rules.

The aforementioned machine learning engine used to generate data rules may include a modality, non-limiting examples of which are natural language processing, trained neural network models, deep learning models, supervised machine learning models, and artificial intelligence models.

The machine learning engine may utilize the historical data rules as an initial set of data rules and subsequently tune the data rules, to thus generate improved data rules, using the current dataset. An "initial" set of data rules may refer to a first set of data rules. Alternatively, an initial set of data rules may refer to an interim set of data rules that precedes the subsequently generated, improved set of data rules.

Alternatively, the machine learning engine may utilize the current dataset to generate an initial set of data rules and subsequently tune the data rules, to thus generate improved data rules, using the historical data rules. An "initial" set of data rules may refer to a first set of data rules. Alternatively, an initial set of data rules may refer to an interim set of data rules that precedes the subsequently generated, improved set of data rules.

The aforementioned computer processor used to query the global dataset may utilize a machine learning engine. The machine learning engine may include a modality, non-limiting examples of which are natural language processing, trained neural network models, deep learning models, supervised machine learning models, and artificial intelligence models. The machine learning engine used to query the global dataset may be the same or a different learning engine than that used to generate the described data rules.

The aforementioned data rules may be used to evaluate the quality of the current dataset and/or specific datapoints thereof.

In another aspect, the data rules may be used to prioritize transmission of specific datapoints, or groups of datapoints, of the current dataset. In another aspect, the data rules may be used to prioritize transmission of component parts of the current dataset.

In other aspects, a method for facilitating transfer of a future new dataset across a network, in accordance with principles of the disclosure, may include the steps of (a) storing a set of existing data rules associated with an existing dataset within a network or data mesh; and (b) configuring a computer processor to (i) identify new incoming datasets entering the network or data mesh and similar to the existing dataset; and (ii) use the existing data rules to facilitate machine learning-aided rule generation for the new incoming dataset(s).

The described existing data rules may be used currently or have been used previously for the existing dataset. The rules may be stored in a folder associated with the existing dataset. The folder may be located within a global dataset of an entity.

The described processing device or computer processor may be programmed or configured to automatically monitor the network or data mesh, e.g., on an ongoing basis, to: (a) determine when a new dataset is received by the network or data mesh; (b) automatically query the network, data mesh, or global dataset, to determine whether an existing dataset(s) has at least one data pattern similar to the new dataset; and (c) if the existing dataset has at least one data pattern similar to the new dataset, using existing data rules (i.e., a set(s) of data rules) from the existing dataset(s) to assist a machine learning engine in generating data rules for use with the new dataset, for example for a data transfer relating to the new dataset. The computer processor may query the network, data mesh, or global dataset to identify the existing data deemed the most similar to the new dataset and use this closest dataset as the starting point for optimizing data rules for data transfer of the new dataset.

The described computer processor may be programmed or configured to (a) determine when a new dataset is received by the network or data mesh; (b) automatically query the network, data mesh, or global dataset, to determine whether said the new dataset has data points overlapping with an existing dataset(s); and (c) if the new dataset has data points overlapping with, or corresponding to, the existing dataset(s), using the data rules associated with the existing dataset to assist a machine learning engine in generating data rules for use with the new dataset, for example for a data transfer relating to the new dataset. The computer processor may query the network, data mesh, or global dataset to identify the existing data deemed the most similar to the new dataset and use this closest dataset as the starting point for optimizing data rules for data transfer of the new dataset.

By this method, transfer of the new dataset across the network may be facilitated.

The mentioned data rules may access one or more applications that are used by an entity or institution and that may be referenced by an AIT (Application Inventory Tool) Number. The data rules may be updated when a first application is merged into a second application or changes from a legacy application to an updated application. The AIT database may be accessible by any of the described optimization/streamlining systems and methods. Such changes may result in, necessitate, or be relevant to data transfers from one location to another within a network. The described methods may include the step of automatically querying the AIT database. The methods may include a further step of using updated application data from the AIT database to modify data rules for a new dataset, such that the modified data rules are in harmony with the updated application data.

The described methods may include the previous step of generating data rules for the existing dataset. Artificial intelligence or a machine learning algorithm or engine may be used to generate the data rules.

The computer processor may be programmed to identify more than one existing dataset having data points overlapping with, or corresponding to, the future new dataset, or having data patterns similar to the new dataset, each with its own set of historical data rules. In any of these cases, the machine learning algorithm or engine may be programmed to attempt to use each of the historical data rule sets to assist it in generating data rules for transferring the future (new) dataset. The machine learning algorithm or engine may begin training with the historical dataset deemed closest to the new dataset, followed by the second closest, etc. The machine learning algorithm or engine may begin training with the historical dataset deemed least similar among the similar datasets identified. The training may then proceed to the next more similar dataset, with progressively greater degrees of similarity, until the dataset deemed the most similar to the new dataset is utilized.

The mentioned plurality of similar historical data sets may be used in parallel, for example by testing each set of historical data rules, to discern which is the most helpful in generating data rules for the (future) new dataset. The plurality of historical data sets may be used iteratively, for example by first testing one set of historical data rules, to generate an initial set of data rules for the new dataset, then using a second set of historical data rules to guide potential improvements in the initial set of data rules. Whether or not improvements are obtained using the second set of historical data rules, the best data rules obtained may be used as a starting point for the next set of potential improvements, which may be guided by a third set of historical data rules, and so on.

The machine learning engine may utilize the plurality of historical data rules to generate an initial set of data rules, followed by an improved or optimized set of data rules. Subsequently, the machine learning engine may tune the improved or optimized data rules, using the new dataset.

Alternatively, the machine learning engine may be programmed to utilize the (future) new dataset to generate an initial set of data rules and subsequently tune the data rules using a plurality of historical data rule sets, for example either in parallel or iteratively, as described herein.

Ongoing potential improvements in a set of data rules may be continually tested by the machine learning algorithm or engine using the new dataset. Efficiency of transfer of the new data, or a data sample, within or across the network, may be the benchmark for assessing improvements in the set of data rules.

The aforementioned data rules may be used to evaluate the quality of the new dataset and/or specific datapoints thereof. In other aspects, the data rules are used to expedite and optimize various data manipulation activities. In other aspects, the data rules are used for testing and/or evaluating data quality. In other aspects, the data rules are used for validating data. In other aspects, the data rules are used for establishing data integration requirements. In other aspects, the data rules are used for improving data integration.

In another aspect, the data rules may be used to prioritize transmission of datapoints of the new dataset.

The aforementioned machine learning engine used to generate data rules may include a modality, non-limiting examples of which are natural language processing, trained neural network models, deep learning models, supervised machine learning models, and artificial intelligence models.

In other aspects, a method for facilitating transfer of a new (current) dataset across a network, in accordance with principles of the disclosure may include the following steps:
  (when a new dataset is received), automatically querying the global dataset via a computer processor to identify an existing dataset having data points corresponding to, or overlapping with, data points in the current dataset;
  for each existing corresponding datapoint (existing data points corresponding to data points in the current dataset), determining whether the existing corresponding datapoint is at least equally trustworthy as the new corresponding data point (the corresponding data point in the current dataset); and
  for each new corresponding data point for which the existing corresponding data point is deemed at least equally trustworthy as the new corresponding data point, deprioritizing transfer of the new corresponding data point.

In some aspects, the method also includes the subsequent step of transferring the current dataset to a recipient location, with prioritization of new datapoints that do not have a corresponding existing datapoint at least equally trustworthy as the new datapoint. In some aspects, the method also includes the subsequent step of transferring only new datapoints that do not have a corresponding existing datapoint at least equally trustworthy as the new datapoint. By this method, transfer of the new (current) dataset across, or within, the network may be facilitated.

When new corresponding data points having an existing corresponding data point at least equally trustworthy (as the new corresponding data point), the system may be programmed to wait for periods of lower data traffic, before transferring these new corresponding data points across, or within, the network. In this way, the system intelligently optimizes which data is transferred over the network for additional processing in the platform layer and which data is cached for offline processing to save data transfer cost and processing power of the application server.

Alternatively, the system may be programmed to not transfer these new corresponding data points within the network. In some aspects, the system may be programmed to deem redundant new corresponding data points found to have an existing corresponding data point deemed at least equally trustworthy. These new data points may be discarded, archived, or placed in low-priority storage. Alternatively, the system may be programmed to subtract from the new dataset new corresponding data points found to have an existing corresponding data point deemed at least equally trustworthy.

The aforementioned computer processor used to query the global dataset may utilize a machine learning engine. The machine learning engine may include a modality, non-limiting examples of which are natural language processing, trained neural network models, deep learning models, supervised machine learning models, and artificial intelligence models. The machine learning engine may be the same or a different learning engine than that used to generate the described data rules.

The system or computer may be programmed to also perform further steps, for example:
  identifying novel data points in the new dataset, meaning data points that lack corresponding data points in the existing dataset; and
  merging the novel data points with the existing dataset.

By the above method, a merged dataset is generated.

The aforementioned method may include still further steps, for example using historical data rules previously used for the existing dataset to tune a machine learning engine in generating data rules, in some aspects, optimized data rules, for use with the merged dataset.

The aforementioned machine learning engine may be programmed to utilize the historical data rules as an initial set of data rules and subsequently tune the data rules, to thus generate improved data rules, using the merged dataset.

Alternatively, the machine learning engine may be programmed to utilize the merged dataset to generate an initial set of data rules and subsequently tune the data rules, to thus generate improved data rules, using the historical data rules.

In other aspects, a method for facilitating transfer of a new (future) dataset across a network associated with a global dataset, in accordance with principles of the disclosure, may include the step of configuring a computer processor to:
  automatically monitor the database (for example, on an ongoing basis) to determine when a (future) new dataset is received by the network;
  automatically query the global dataset to identify an existing dataset having data points corresponding to data points in the new dataset;
  for each existing corresponding datapoint (existing data points corresponding to data points in the new dataset), determining whether the existing corresponding datapoint is at least equally trustworthy than the new corresponding data point (the corresponding data point in the new dataset); and
  for each new corresponding data point for which the existing corresponding data point is deemed at least equally trustworthy than the new corresponding data point, deprioritizing transfer of the new corresponding data point By this method, transfer of the new dataset across the network may be facilitated.

In some aspects, the method also includes the subsequent step of transferring the current dataset to a recipient location, with prioritization of new datapoints that do not have a corresponding existing datapoint at least equally trustworthy as the new datapoint. In some aspects, the method also includes the subsequent step of transferring only new datapoints that do not have a corresponding existing datapoint at least equally trustworthy as the new datapoint. By this method, transfer of the new (current) dataset across, or within, the network may be facilitated.

The method may include the previous step of generating data rules for the existing dataset. Artificial intelligence or a machine learning algorithm or engine may be used to generate the data rules.

The method may include the additional step of generating data rules for the new dataset, for example to transfer only necessary and/or non-redundant data points. Artificial intelligence or a machine learning algorithm or engine may be used to generate the data rules.

The machine learning engine may be programmed to utilize the (future) new dataset to generate an initial set of data rules and subsequently tune the data rules using historical data rule set(s).

In some aspects, the machine learning engine may be programmed to utilize the historical dataset(s) to generate an initial set of data rules and subsequently tune the data rules using the (future) new data rule set.

Ongoing potential improvements in a set of data rules may be continually tested by the machine learning algorithm or engine using the new dataset. Efficiency of transfer of the new data, or a data sample, within or across the network may be the benchmark for assessing improvements in the set of data rules.

The aforementioned machine learning engine may include a modality, non-limiting examples of which are natural language processing, trained neural network models, deep learning models, supervised machine learning models, and artificial intelligence models.

The aforementioned computer processor may utilize a machine learning engine. The machine learning engine may include a modality, non-limiting examples of which are natural language processing, trained neural network models, deep learning models, supervised machine learning models, and artificial intelligence models. The machine learning engine may be the same or a different learning engine than that used to generate the described data rules.

The method may include further steps, for example;
identifying novel data points in the new dataset, meaning data points that lack corresponding data points in the existing dataset; and
merging the novel data points with the existing dataset.
By the above method, a merged dataset is generated.

The aforementioned method may include still further steps, for example using historical data rules previously used for the existing dataset to tune a machine learning engine in generating updated data rules for use with the merged dataset.

The aforementioned machine learning engine may utilize the historical data rules as an initial set of data rules and subsequently tune the data rules, to thus generate improved data rules, using the merged dataset.

The system may be programmed or configured to generate a data transfer rule set for governing data transfer over the network. A machine learning engine may be used to generate the data transfer rule set. The machine learning engine may be configured for receiving and analyzing data in a new dataset and generating a data transfer rule set based on an analysis of new dataset. In some aspects, the data transfer rule set defines a data configuration for transferring said data from an edge layer to a platform layer, e.g., over available data channels. In some aspects, the data transfer rule set defines a configuration of the devices and/or associated data for transferring said data from an edge layer to a platform layer, e.g., over available data channels. In some aspects, the data transfer rule set defines a data configuration for transferring the data from a platform layer to an enterprise layer. In some aspects, the data transfer rule set generated by the machine learning engine may include, or consist of, an initial rule set to be further optimized by the system. In some aspects, data transfer rules may be initially set by a maintaining entity or from a previously executed data transfer and stored in a master rule database.

In some aspects, the system may be configured or programmed to calculate a data configuration flow based on the data transfer rule set. The data configuration flow may be an optimized organization of data to be transferred from the edge layer to the platform layer. In other aspects, the data configuration flow may be an optimized organization of data to be transferred from the platform layer to the enterprise layer. A machine learning engine may receive and process information in a new dataset to determine an optimal flow of data, for example, across, or within, the network.

In some aspects of the described methods, individual data fields are records are evaluated for compliance with a particular condition. In some aspects, the data is evaluated positively, for example by tagging records or fields that meet the specified condition. In other aspects, the data is evaluated negatively, for example by tagging records or fields that violate the condition.

In some aspects of the described methods and systems, metrics are utilized to consolidate detailed statistical results from one or more data rules, rule sets, or other metric results into a meaningful measurement. In some aspects, the metric(s) are selected from transfer efficiency, transfer speed, or data volume required to save a particular dataset, or a portion thereof.

In some aspects of the described method and systems, folders are utilized to organize and view data rules, rule sets, and metrics. In other aspects, folders are used to organize data rules, rule sets, and metrics based on various business tasks. In other aspects, data rules, rule sets, and metric are organized by data sources or systems.

In some aspects of the described method and systems, data quality or trustworthiness is ascertained. Data quality definitions against which a data value may be checked may include, but are not limited to, one or more of data integrity definitions, data semantics definitions, definitions relating to functional dependencies of the data element, definitions minimizing data redundancies, and definitions minimizing data anomalies. Data integrity definitions check whether the probable data value satisfies pre-defined integrity constraints such as pre-defined foreign key constraints and primary key constraints between data tables. Data semantics definitions check whether the probable data value satisfies pre-defined data semantics including whether the data value has a correct data type (e.g., number type, string type), is assigned a correct column name, and the like. Definitions relating to functional dependencies check whether the probable data value satisfies pre-defined functional dependencies with other data, such as dependency on data from another data table. Definitions against data redundancies check for data redundancies such as data duplication. Definitions against other data anomalies check for vagueness in the probable data value. For example, the probable data value cannot include a string when a number value is expected for the data element. An error resolver may reject probable data values of the data element that do not satisfy one or more of the above pre-defined data quality definitions.

In some aspects, the described machine learning modality is a quantum optimization engine. The quantum optimization engine may be configured to utilize one or more quantum algorithms to process the inputted data. Non-limiting examples of quantum algorithms are selected from, for example, Fourier transform-based algorithms, amplitude amplification-based algorithms, quantum walk-based algorithms, and the like. In one embodiment, the system is configured to employ a hybrid quantum/classical algorithm. The quantum optimization engine may input an initial data transfer rule set from the corresponding existing dataset and use it to process the new data. The engine may further hone the data rules, using the new data, thus further optimizing the data rules.

Non-limiting examples of data rules useful in the present invention include, for example, rules to optimize one or more data configuration flows within the network; or data configuration flows from a plurality of user devices. The rules may be used to determine an efficient data configuration flow or use of one or more available data channels between the devices and another system such as an application server in a platform layer. The machine learning modality may input an initial data transfer rule set from the corresponding existing dataset and use it to process the new data. The modality may further hone the data rules, using the new data, to determine an optimal transfer of data within the network, or other parameters.

In some aspects, the described machine learning engine, system, or algorithm may include:
at least one memory device with computer-readable program code stored thereon;
at least one communication device;
at least one processing device operatively coupled to the at least one memory device and the at least one communication device, in which executing the computer-readable code is configured to cause the at least one processing device to:
receive input data for analysis by a regulated machine learning model and a data rule machine learning engine;
detect, via the regulated machine learning model, data quality metrics of the input data, in which the metrics include rules, regulations, policies, predetermined thresholds, and/or known reference data and patterns;
formulate draft data rules using the machine learning engine;
test the draft data rules on the input data;
determine, via the machine learning engine, an incremental learning threshold based on the received data rules;
retrain the regulated machine learning model to incorporate the results of testing the draft data rules, wherein the retraining further comprises using input data within the incremental learning threshold;
determine, via the regulated machine learning model, an optimization learning adjustment for optimizing accuracy of the regulated machine learning model based on received input data; and
balance the optimization learning adjustment with the incremental learning threshold to optimize retraining of the machine learning model within boundaries of the incremental learning threshold.

The rule parameter engine may be configured to input data to a quantum optimization engine to provide an output decision of an optimized data transfer configuration to a data flow orchestration engine (not depicted) to execute the optimized data transfer to and/or from the devices. In some aspects, the machine learning engine may be configured to generate a data rule set, including rules and computational scoring logic to be input to the quantum optimization engine. In some aspects, the rules and/or logic may be provided to the engine as an initial starting point or recommendation.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows an illustrative block diagram of system 100 that includes computer 101. Computer 101 may alternatively be referred to herein as an "engine," "server" or a "computing device." Computer 101 may be a workstation, desktop, laptop, tablet, smartphone, or any other suitable computing device. Elements of system 100, including computer 101, may be used to implement various aspects of the systems and methods disclosed herein. Each of the systems, methods and algorithms illustrated below may include some or all of the elements and apparatus of system 100.

Computer 101 may have a processor 103 for controlling the operation of the device and its associated components, and may include RAM 105, ROM 107, input/output ("I/O") 109, and a non-transitory or non-volatile memory 115. Machine-readable memory may be configured to store information in machine-readable data structures. The processor 103 may also execute all software running on the computer. Other components commonly used for computers, such as EEPROM or Flash memory or any other suitable components, may also be part of the computer 101.

The memory 115 may be comprised of any suitable permanent storage technology—e.g., a hard drive. The memory 115 may store software including the operating system 117 and application program(s) 119 along with any data 111 needed for the operation of the system 100. Memory 115 may also store videos, text, and/or audio assistance files. The data stored in memory 115 may also be stored in cache memory, or any other suitable memory.

I/O module 109 may include connectivity to a microphone, keyboard, touch screen, mouse, and/or stylus through which input may be provided into computer 101. The input may include input relating to cursor movement. The input/ output module may also include one or more speakers for providing audio output and a video display device for providing textual, audio, audiovisual, and/or graphical output. The input and output may be related to computer application functionality.

System 100 may be connected to other systems via a local area network (LAN) interface 113. System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include a local area network (LAN) 125 and a wide area network (WAN) 129 but may also include other networks. When used in a LAN networking environment, computer 101 is connected to LAN 125 through LAN interface 113 or an adapter. When used in a WAN networking environment, computer 101 may include a modem 127 or other means for establishing communications over WAN 129, such as Internet 131.

It will be appreciated that the network connections shown are illustrative, and other means of establishing a communications link between computers may be used. The existence of various well-known protocols such as TCP/IP, Ethernet, FTP, HTTP and the like is presumed, and the system can be operated in a client-server configuration to permit retrieval of data from a web-based server or application programming interface (API). Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may include instructions to store the data in cache memory, the hard drive, secondary memory, or any other suitable memory.

Additionally, application program(s) 119, which may be used by computer 101, may include computer executable instructions for invoking functionality related to communication, such as e-mail, Short Message Service (SMS), and voice input and speech recognition applications. Application program(s) 119 (which may be alternatively referred to herein as "plugins," "applications," or "apps") may include computer executable instructions for invoking functionality related to performing various tasks. Application program(s) 119 may utilize one or more algorithms that process received executable instructions, perform power management routines or other suitable tasks.

Application program(s) 119 may include computer executable instructions (alternatively referred to as "programs"). The computer executable instructions may be embodied in hardware or firmware (not shown). The computer 101 may execute the instructions embodied by the application program(s) 119 to perform various functions.

Application program(s) 119 may utilize the computer-executable instructions executed by a processor. Generally, programs include routines, programs, objects, components, data structures, etc., that perform particular tasks or implement particular abstract data types. A computing system may be operational with distributed computing environments where tasks are performed by remote processing devices that are linked through a communications network. In a distributed computing environment, a program may be located in both local and remote computer storage media including memory storage devices. Computing systems may rely on a network of remote servers hosted on the Internet to store, manage, and process data (e.g., "cloud computing" and/or "fog computing").

Any information described above in connection with data 111, and any other suitable information, may be stored in memory 115.

The invention may be described in the context of computer-executable instructions, such as application(s) 119, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. It should be noted that such programs may be considered, for the purposes of this application, as engines with respect to the performance of the particular tasks to which the programs are assigned.

Computer 101 and/or terminals 141 and 151 may also include various other components, such as a battery, speaker, and/or antennas (not shown). Components of computer system 101 may be linked by a system bus, wirelessly or by other suitable interconnections. Components of computer system 101 may be present on one or more circuit boards. In some embodiments, the components may be integrated into a single chip. The chip may be silicon-based.

Terminal 141 and/or terminal 151 may be portable devices such as a laptop, cell phone, tablet, smartphone, or any other computing system for receiving, storing, transmitting and/or displaying relevant information. Terminal 141 and/or terminal 151 may be one or more user devices. Terminals 141 and 151 may be identical to system 100 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones, smart phones and/or other personal digital assistants ("PDAs"), multiprocessor systems, microprocessor-based systems, cloud-based systems, programmable consumer electronics, network PCs, minicomputers, mainframe computers, distributed computing environments that include any of the above systems or devices, and the like.

FIG. 2 shows illustrative apparatus 200 that may be configured in accordance with the principles of the disclosure. Apparatus 200 may be a computing device. Apparatus 200 may include one or more features of the apparatus shown in FIG. 2. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions, (which may be alternatively referred to herein as "computer instructions" or "computer code"), applications such as applications 119, signals, and/or any other suitable information or data structures.

Components 202, 204, 206, 208 and 210 may be coupled together by a system bus or other interconnections 212 and may be present on one or more circuit boards such as circuit board 220. In some embodiments, the components may be integrated into a single chip. The chip may be silicon-based.

Figure 3A:
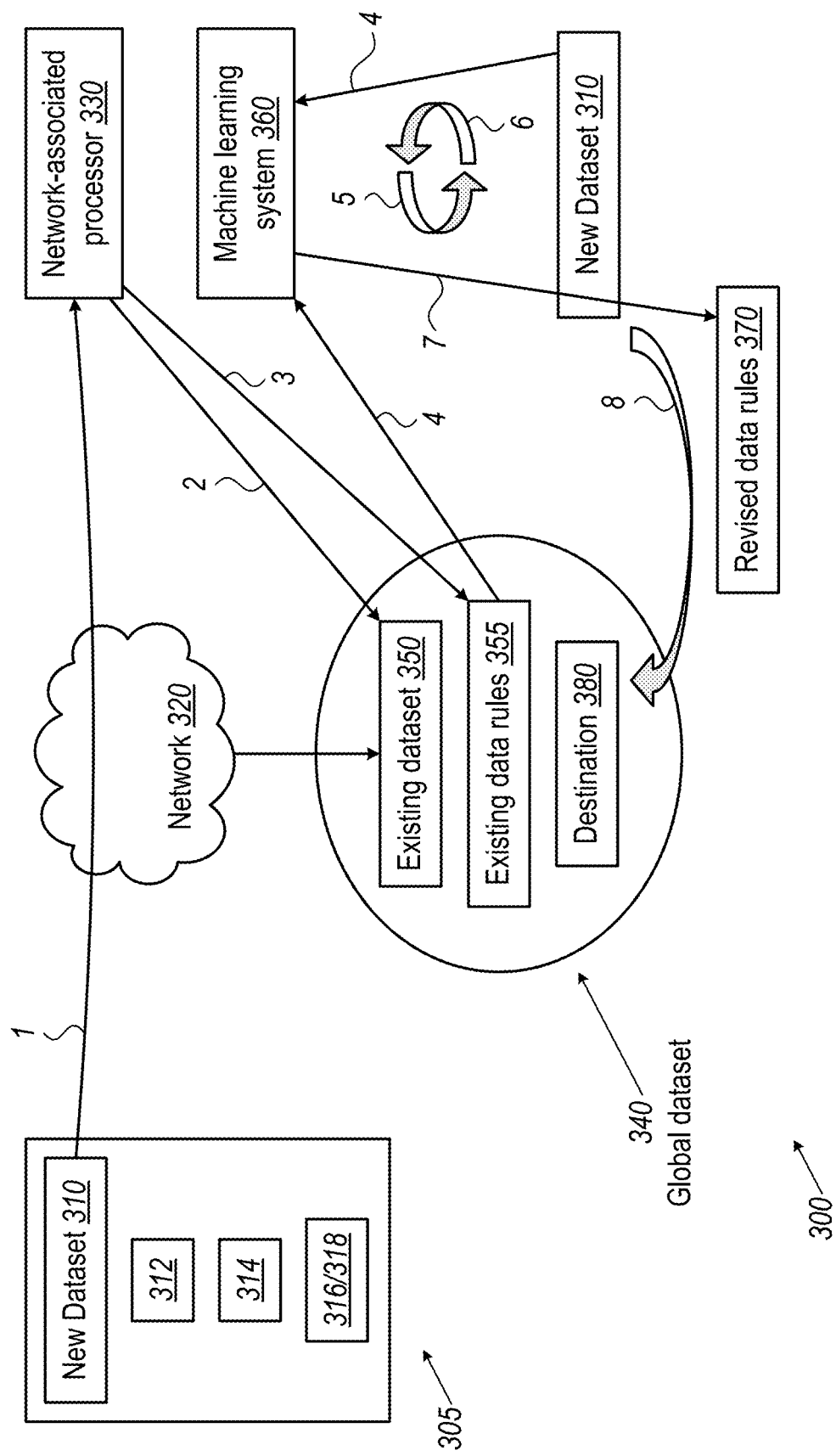
FIG. 3A is a flow diagram depicting a system for data rule generation and optimization, using a machine learning engine, in accordance with principles of the disclosure.
Figure 3B:
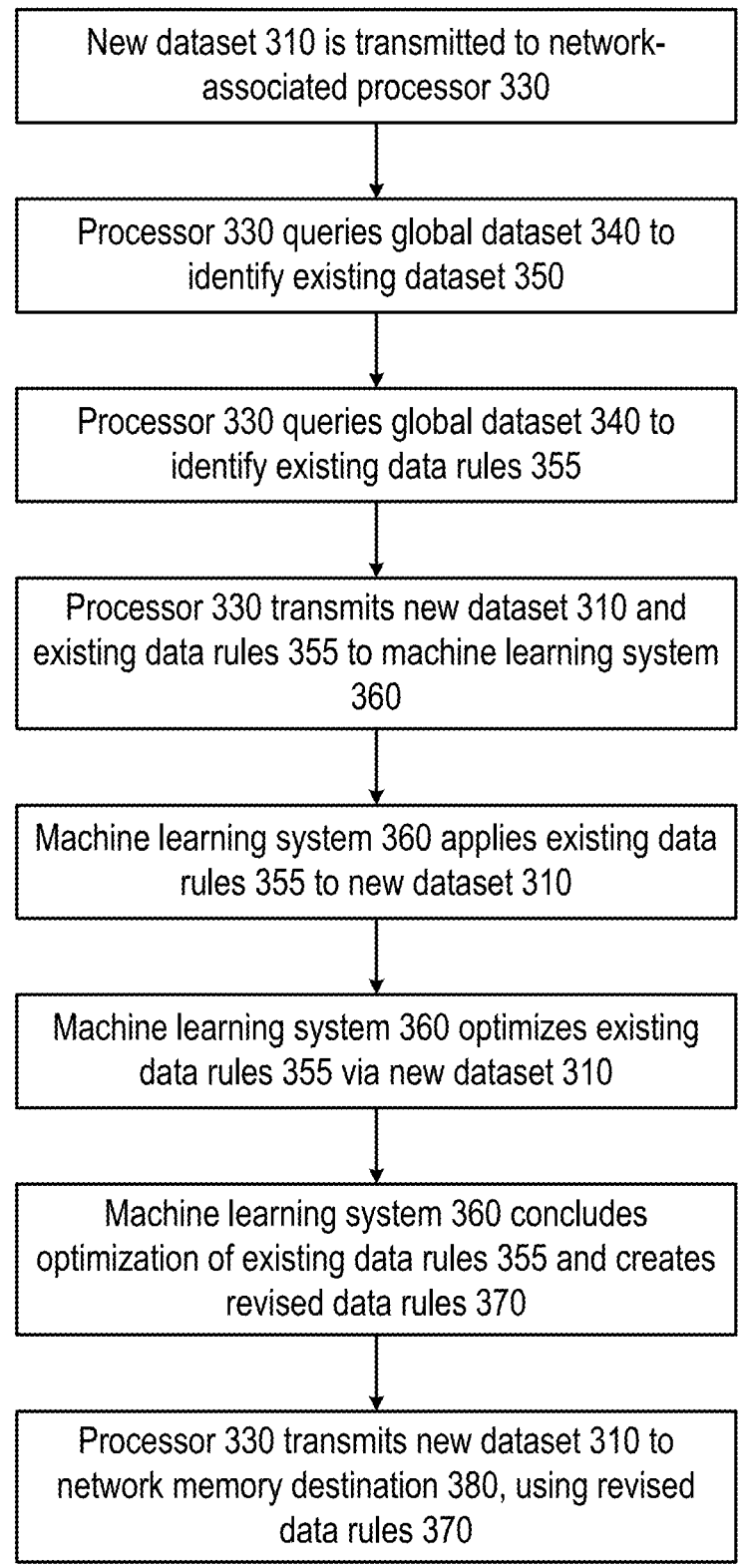
FIG. 3B is a simplified flow chart of the steps shown in FIG. 3A.

FIG. 3A provides a diagram of a system environment and data flow for the described methods, in accordance with embodiments of the disclosure. The illustrative block diagram of system 300 includes one or more user computer systems 305 that are operatively coupled, via a network 320, to one or more machine learning engines 360, each including computer readable code for executing one or more machine learning operations. In this way, the user computer system(s) 305 may transmit dataset to the machine learning engine(s) 360. The user computer systems 305 may be the depicted user computer systems 305, or other systems. FIG. 3B is a simplified flow chart of the steps shown in FIG. 3A.

Exemplary method steps are set forth below and depicted in FIGS. 3A-B.

As used herein, the term "user" may refer to any entity or individual associated with the collaborative machine learning engine. In some aspects, a user may be a computing device user, a phone user, a mobile device application user, a customer of an entity or business, a system operator, and/or employee of an entity (e.g., a financial institution). In some aspects, users may be one or more of associates, employees, agents, contractors, sub-contractors, third-party representatives, customers, or the like.

As illustrated in FIG. 3, one or more user computer systems 305 are operatively coupled, via a network 320, to one or more computer processors 330, which may be associated with the network, for example in a platform layer. In this way, the one or more user computer systems 305 may transmit data via network 320 to one or more processing devices 330.

The network 320 illustrated in FIG. 3, through which the components communicate, may be a global area network (GAN), such as the Internet, a wide area network (WAN), a local area network (LAN), or any other type of network or combination of networks. The network 320 may provide for wireline, wireless, or a combination of wireline and wireless communication between systems, services, components, and/or devices on the network 320.

As illustrated in FIG. 3, the one or more user computer systems 305 may include one or more communication components 312, one or more processor components 314, and one or more memory components 316. The one or more processor components 314 are operatively coupled to the one or more communication components 312 and the one or more memory components 316. As used herein, the term "processor" generally includes circuitry used for implementing the communication and/or logic functions of a particular system. For example, a processor component 314 may include a digital signal processor, a microprocessor, and various analog-to-digital converters, digital-to-analog converters, and other support circuits and/or combinations of the foregoing. Control and signal processing functions of the system are allocated between these processor components according to their respective capabilities. The one or more processor components 314 may include functionality to operate one or more software programs based on computer-readable instructions 318 thereof, which may be stored in the one or more memory components 316.

The one or more processor components 314 use the one or more communication components 312 to communicate with the network 320 and other components on the network 320, such as, but not limited to, the one or more machine learning engines 360 and the one or more computer processors 330. As such, the one or more communication components 312 generally comprise a wireless transceiver, modem, server, electrical connection, electrical circuit, or other component for communicating with other components on the network 320. The one or more communication components 312 may further include an interface that accepts one or more network interface cards, ports for connection of network components, Universal Serial Bus (USB) connectors, and the like.

The computer processor(s) 330 may include components similar to one or more communication components 312, one or more processor subcomponents 314, one or more memory components 316, and computer-readable instructions 318; however, such components are not depicted in FIG. 3.

User computer system 305 may alternatively be referred to herein as an "engine," "server" or a "computing device." User computer system 305 may be any computing device described herein, such as the computing devices running on a computer, smart phones, smart cars, smart cards, and any other mobile device described herein. Elements of user computer system 305 may be used to implement various aspects of the systems and methods disclosed herein.

As further illustrated in FIGS. 3A-B, in a first step of a method in accordance with the present disclosure, user computer system 305 transmits new dataset 310 via network 320, to computer processor 330.

In a second step, computer processor 330 queries global dataset 340, via network 320 (network connection not depicted), to identify similar existing dataset 350.

In a third step, computer processor 330 queries global dataset 340, via network 320 (routing via network not depicted), to identify existing data rules 355 that are associated with existing dataset 350.

In a fourth step, computer processor 330 transmits new dataset 310 and existing data rules 355, via network 320 (routing via processor and network not depicted), to machine learning engine 360.

In a fifth step, machine learning engine 360 applies existing data rules 355 to new dataset 310.

In a sixth step, machine learning engine 360 optimizes existing data rules 355, using new dataset 310.

In a seventh step, machine learning engine 360 determines that optimization of existing data rules 355 is sufficient to create revised data rules 370.

In an eighth step, computer processor 330 transmits new dataset 310, via network 320 (routing via network not depicted), to network memory destination 380, using revised data rules 370.

Figure 4A:
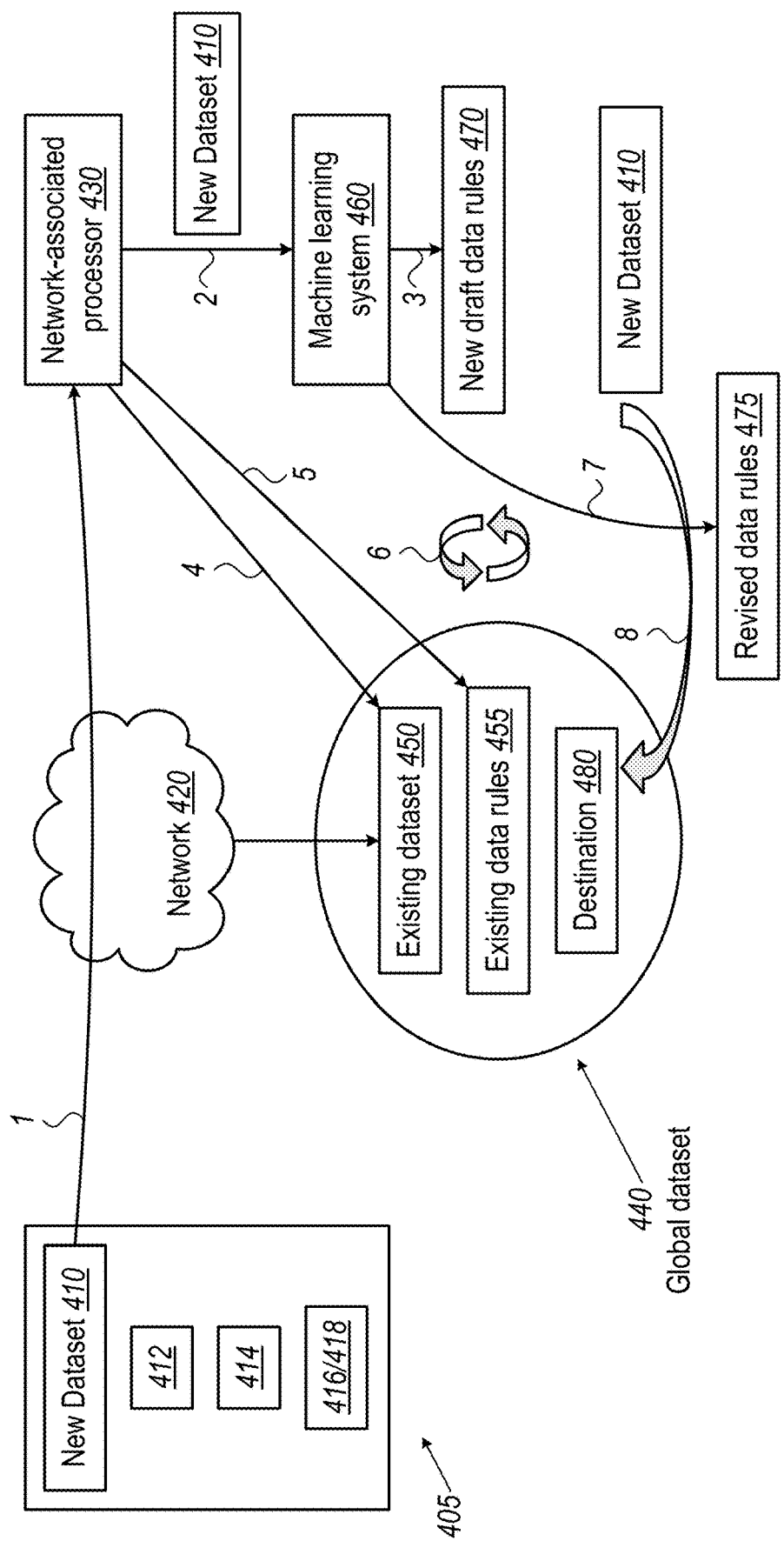
FIG. 4A is a flow diagram depicting a system for data rule generation and optimization, using a machine learning engine, in accordance with principles of the disclosure.
Figure 4B:
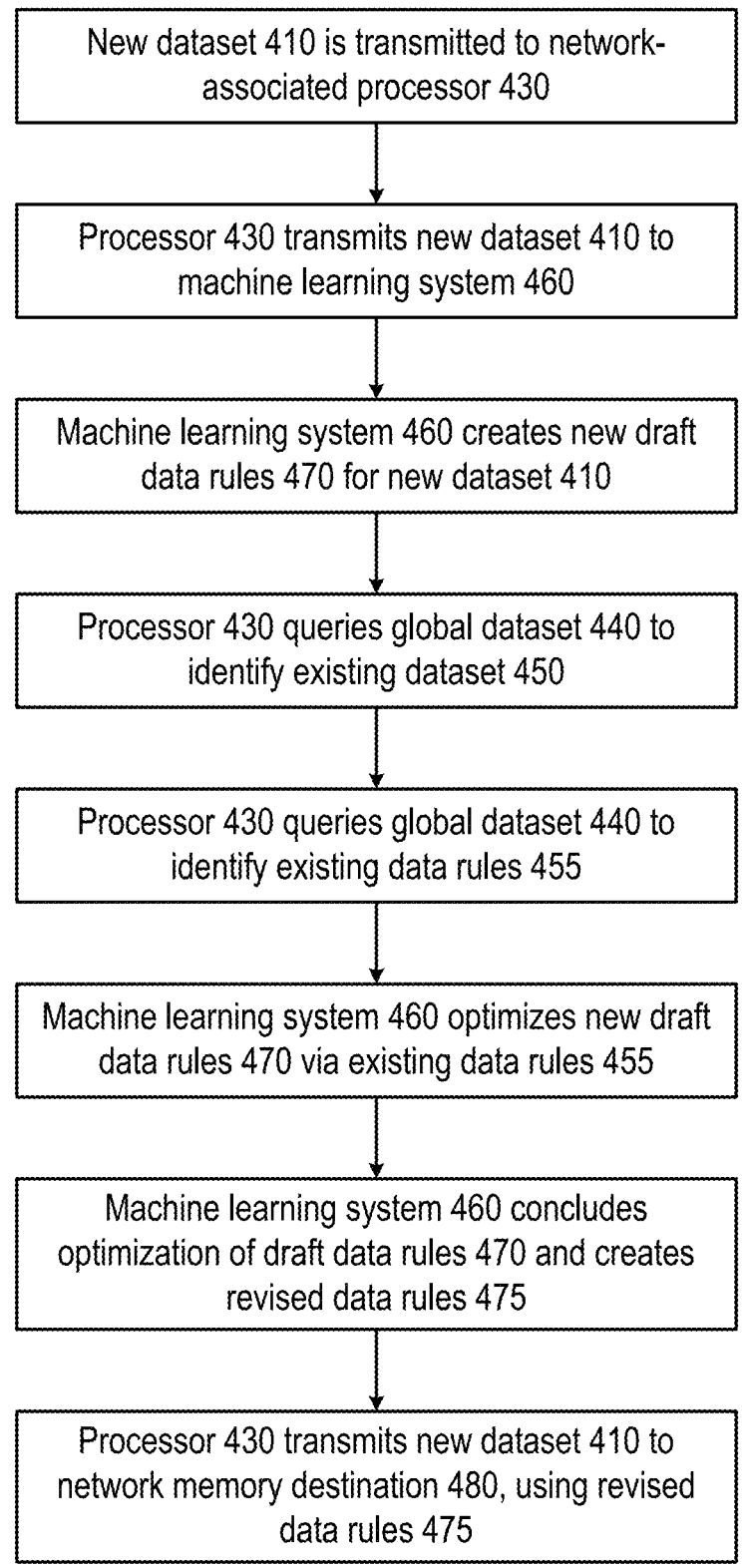
FIG. 4B is a simplified flow chart of the steps shown in FIG. 4A.

FIG. 4A provides a diagram of a system environment and data flow for the described methods, in accordance with embodiments of the disclosure. The system is programmed to perform a similar process to FIG. 3, except that the new dataset is used to generate the draft data rules, after which the machine learning engine uses the existing data rules to optimize the data rule. The illustrative block diagram of system 400 includes one or more user computer systems 405 that are operatively coupled, via a network 420, to one or more machine learning engines 460, each including computer readable code for executing one or more machine learning operations. In this way, the user computer system(s) 405 may transmit dataset to the machine learning engine(s) 460. The user computer systems 405 may be the depicted user computer systems 405, or other systems. FIG. 4B is a simplified flow chart of the steps shown in FIG. 4A.

Exemplary method steps are set forth below and depicted in FIGS. 4A-B.

In a first step of a method, user computer system 405 transmits new dataset 410 via network 420, to computer processor 430.

In a second step, computer processor 430 transmits new dataset 410 via network 320 (network connection not depicted) to machine learning engine 460.

In a third step, machine learning engine 460 creates new draft data rules 470 for new dataset 410.

In a fourth step, computer processor 430 queries global dataset 440, via network 420 (network connection not depicted), to identify similar existing dataset 450.

In a fifth step, computer processor 430 queries global dataset 440, via network 420 (network connection not depicted), to identify existing data rules 455 that are associated with existing dataset 450.

In some aspects, the fourth and fifth steps can be performed prior to, simultaneously, or following the third step.

In a sixth step, machine learning engine 460 optimizes new draft data rules 470, using existing data rules 455.

In a seventh step, machine learning engine 460 determines that optimization of new draft data rules 470 is sufficient to create revised data rules 475.

In an eighth step, computer processor 430 transmits new dataset 410, via network 420 (network connection not depicted), to network memory destination 480, using revised data rules 475.

In some aspects, the machine learning engine 360 or 460 may associate with applications having computer-executable program code that instruct the computer processor 330/430 to perform certain functions described herein. In one embodiment, the computer-executable program code of an application associated with the user device 305/405 or third party systems (not depicted) may also instruct the processor 330/430 to perform certain logic, data processing, and data storing functions of the application.

Figure 5:
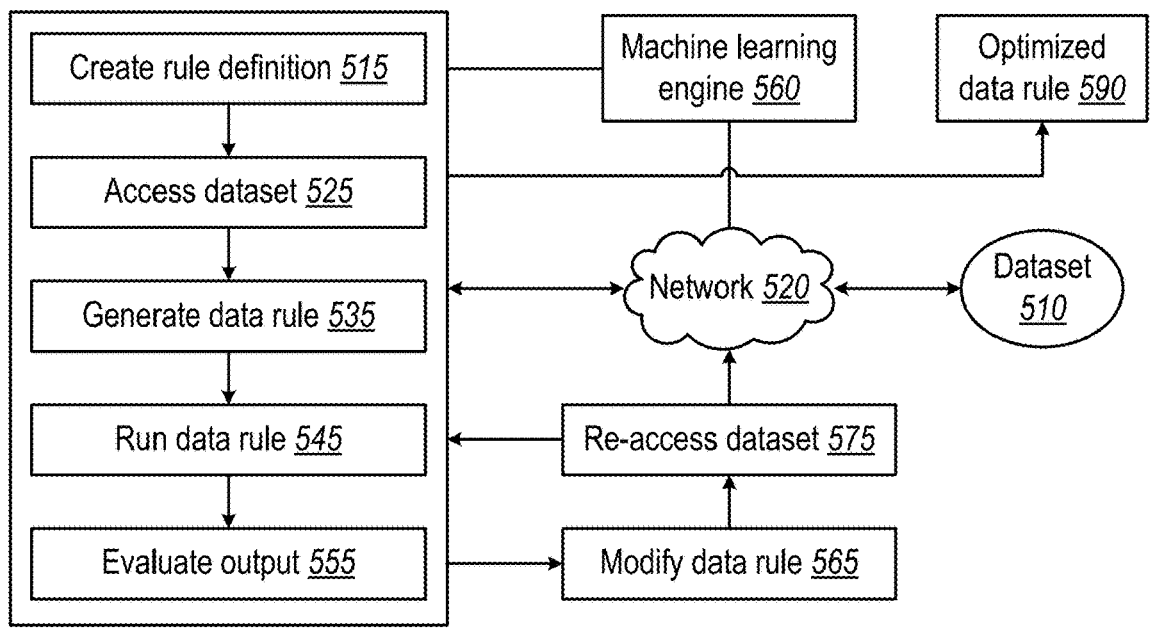
FIG. 5 is a flow diagram depicting a system iterative rule optimization via machine learning algorithms, in accordance with principles of the disclosure.

FIG. 5 is a simplified block diagram depicting the iterative nature of rule optimization via machine learning algorithms. Machine learning algorithm 560 creates a rule definition (step 515), accesses the dataset of interest 510 through network 520 (step 525), and generates a data rule (step 535). The machine learning algorithm 560 runs the data rule on the dataset (step 545) and evaluates the output (step 555). If the output requires optimization (or further optimization, in case it has already undergone some optimization), machine learning algorithm 560 modifies the data rule (step 565), re-accesses the dataset (step 575), and returns to step 545 as many times as is deemed necessary to achieve optimized data rule 590.

Figure 6:
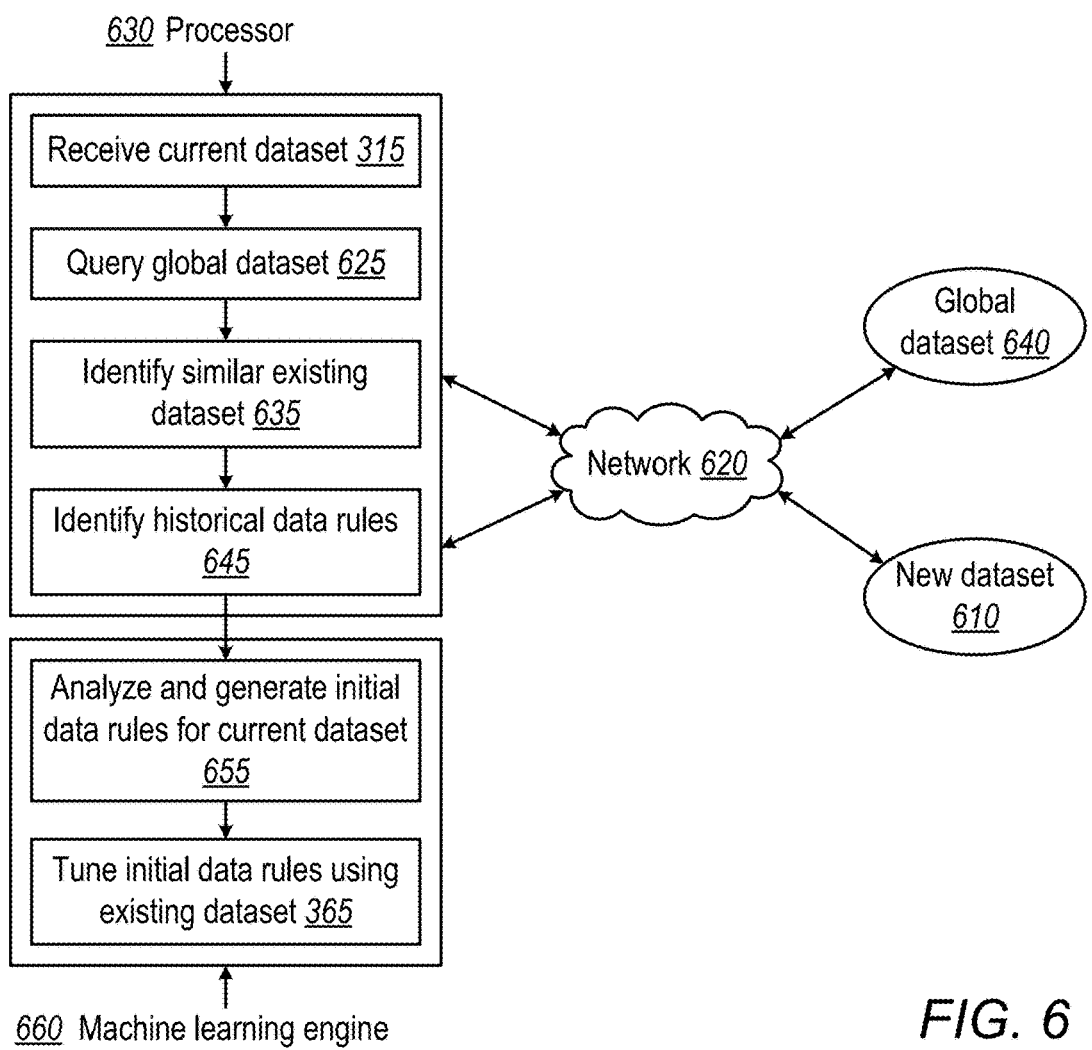
FIG. 6 is a simplified flow chart showing a data rule optimization process, in accordance with principles of the disclosure.

FIG. 6 is a simplified flow chart showing a data rule optimization process, in accordance with embodiments of the disclosure. A new (current) dataset 610 is received by computer processor 630 (step 615). Computer processor 630 queries global dataset 640 via network 620 (step 625) to identify a similar existing dataset (not depicted) within global dataset 640 (step 635) and identify historical data rules (not depicted) associated with the existing dataset (step 645). Machine learning engine 660 analyzes new dataset 610 and generates initial data rules (not depicted) for the new dataset 610 (step 655), and subsequently tunes the initial data rules using the existing dataset (step 665). In other embodiments, one or more machine learning engines performs all the depicted steps (not separately depicted).

Figure 7:
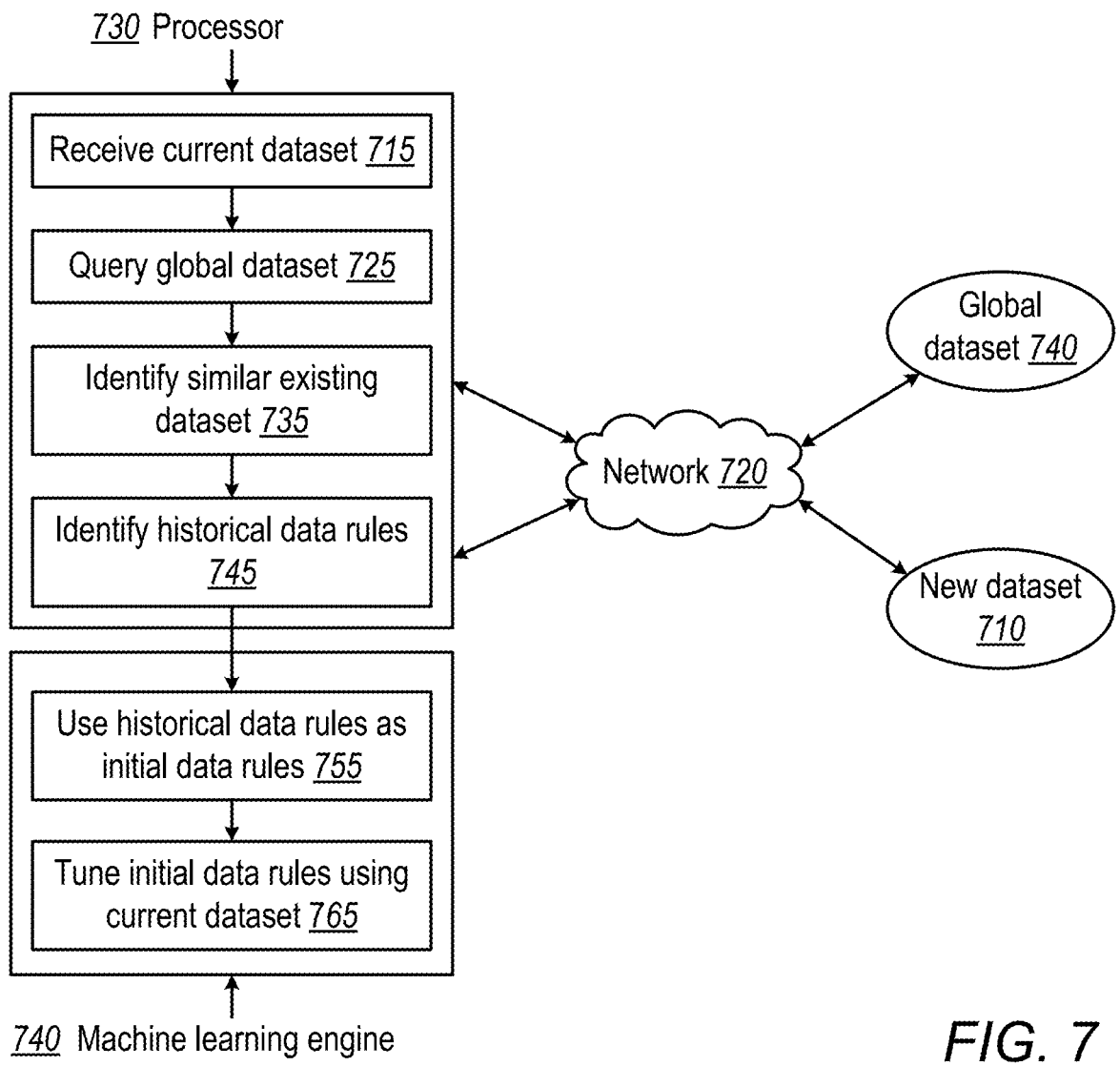
FIG. 7 is a simplified flow chart showing a data rule optimization process, in accordance with principles of the disclosure.

FIG. 7 is a simplified flow chart showing a data rule optimization process, in accordance with embodiments of the disclosure. A new (current) dataset 710 is received by computer processor 730 (step 715). Processor 730 queries global dataset 740 via network 720 (step 725) to identify a similar existing dataset (not depicted) within global dataset 740 (step 735) and identify historical data rules (not depicted) associated with the existing dataset (step 745). Machine learning engine 740 uses historical data rules as initial data rules (step 755), and subsequently tunes the initial data rules by analyzing new dataset 710 (step 465). In other embodiments, one or more machine learning engines performs all the depicted steps (not separately depicted).

Figure 8:
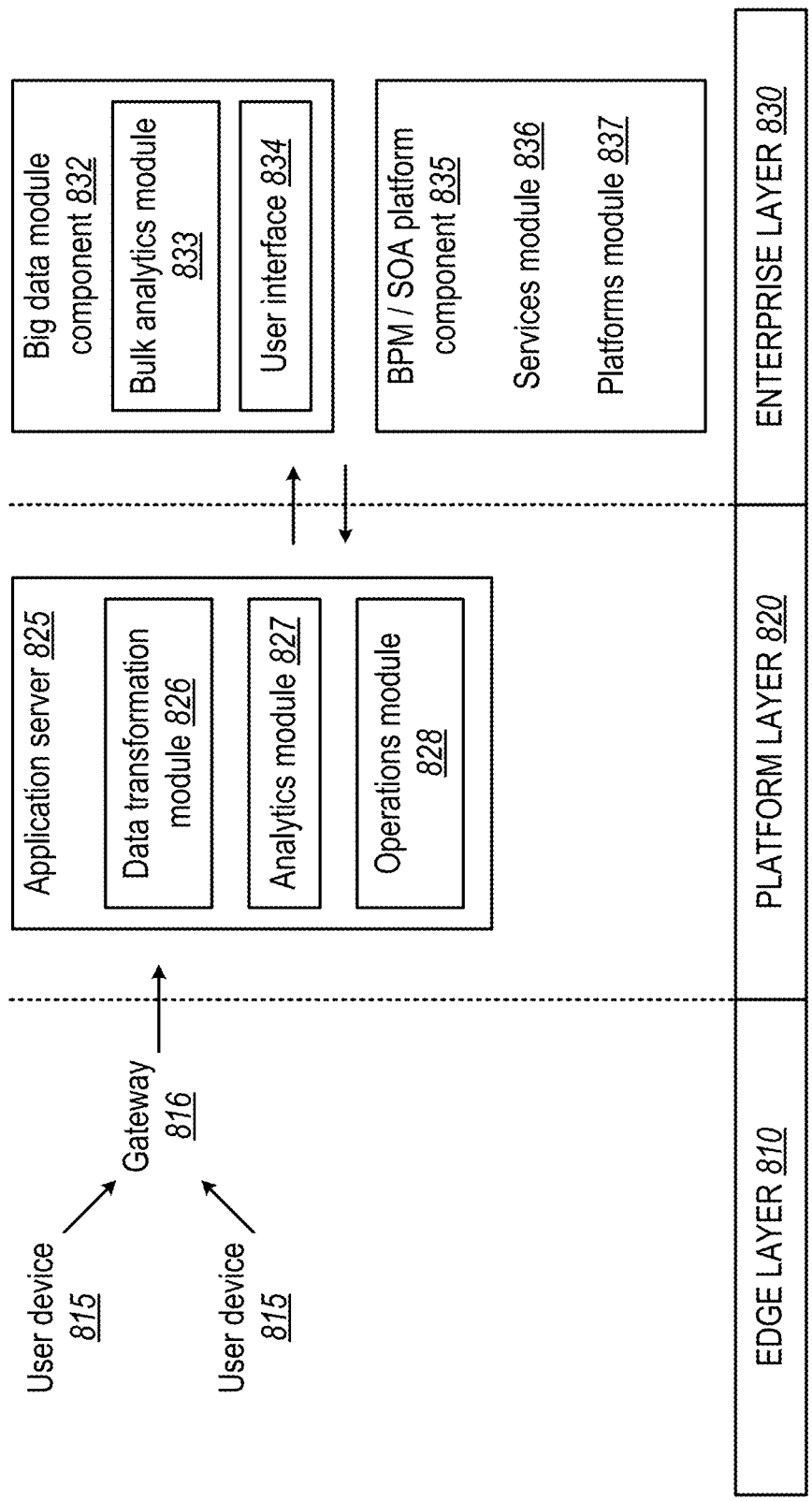
FIG. 8 is a simplified block diagram depicting a network environment, in accordance with principles of the disclosure.

FIG. 8 is a simplified block diagram depicting a network environment, including an edge layer 810, a platform layer 820, and an enterprise layer 830. The edge layer 810 may include one or more user devices 815, which may be configured to provide a first level of data processing for the system, a gateway 816, and a user interface (not depicted). The platform layer 820 may include an application server 825 that receives data from the devices 815 and/or gateway 816 of the edge layer 810. The platform layer 820 may also include a data transformation module 826, configured for transforming data transmitted between the edge layer 810 and enterprise layer 830; an analytics module 827 and an operations module 828 for processing data at the platform layer 820; and or a user interface (not depicted).

The platform layer 820 is in communication with enterprise layer 830, which is positioned farthest from network edge layer 810. The enterprise layer is a centralized data center offering processing and storage resources. The enterprise layer 830 may include a big data module component 832, and/or a business processes management (BPM) and service-oriented architecture (SOA) platform component 835. The big data component 835 comprises a bulk analytics module 833 and a user interface 834. The BPM and SOA platform component 835 comprises a services module 836 and a platforms module 837.

In other aspects, the edge layer 810 includes a plurality of networked devices. The devices are in communication with an artificial intelligence and/or machine learning algorithm (not depicted) which, in turn, is further in communication with a global dataset and a master rule engine (both not depicted) in the platform layer 820. The devices are further in communication with an application consuming data or application server (not depicted) in the platform layer 820 which is configured to transmit data back to a configurable rule parameter engine (not depicted) in the edge layer 810.

Figure 9:
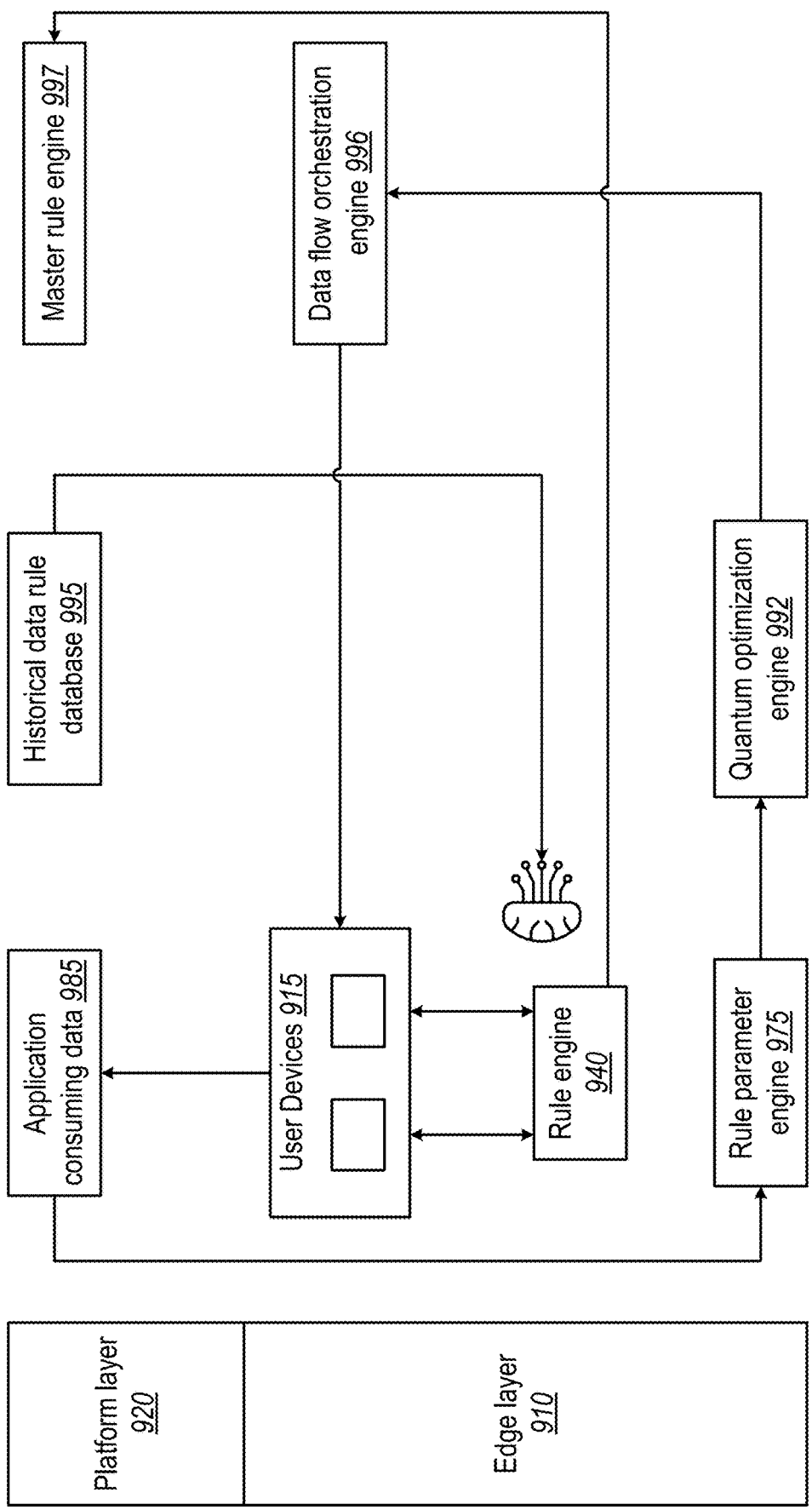
FIG. 9 is a block diagram of an edge computing configuration, in accordance with one embodiment of the disclosure.

FIG. 9 provides an illustration of an edge computing configuration, in accordance with one embodiment of the disclosure. The illustrated configuration comprises at least an edge layer 910 and a platform layer 920. The edge layer 910 of FIG. 9 comprises one or more user devices 915.

The user devices 915 may be in communication with an artificial intelligence and/or machine learning rule engine 940 which, in turn, may be further in communication with a historical data rule repository or database 995, and optionally further in communication with a master rule engine 997, in the platform layer 920. The devices 915 may be further in communication with an application consuming data or application server 985, in the platform layer 920, which is configured to transmit data back to a configurable rule parameter engine 975 in the edge layer 910. The rule parameter engine 975 may be configured to input data to a quantum optimization engine 992 to provide an output decision of an optimized data transfer configuration to a data flow orchestration engine 996 to execute an optimized data transfer to and/or from the devices 915.

In some aspects, in accordance with embodiments of the disclosure, a process is provided for executing intelligent data transfer. In some embodiments, the process flow is executed or performed by a system leveraging the environments of the previous figures, for example FIG. 9. The system is configured to first collect a dataset from a user device(s), the user device(s), the user device(s) being connected to a device gateway in an edge layer of the network.

In some aspects, the system may be configured to combine the collected dataset data with data rule set(s) stored in a historical data rule repository or database.

In some aspects, the system may be configured to initially prioritize particular devices. For example, mapping of connected devices may be used by the system to initially group and prioritize data transfers from one or more of the user devices. Alternatively, the system may decide to temporarily cache data associated with lower priority devices for a delayed data transfer following the higher priority devices.

In some aspects, the system may be configured to generate a data transfer rule set for governing data transfer from the user devices over the network based on the combined data. To generate the data transfer rule set, the system may utilize a machine learning engine. The machine learning engine may be configured for receiving and analyzing the combined dataset and historical data rules database; and generating the data transfer rule set based on an analysis of the combined data. In some embodiments, the data transfer rule set may define a configuration of the devices and/or associated data for transferring the data from the edge layer to the platform layer over available data channels. In some embodiments, the data transfer rule set generated by the machine learning engine may comprise an initial rule set to be further optimized by the system. In some embodiments, the data transfer rule set provides predetermined guidelines for which transferred data or device employ a shared data channel and which data or devices are restricted from sharing data channels. In some embodiments, data transfer rules may be initially set by a maintaining entity or from a previously executed data transfer and stored in a master rule database.

In some aspects, the system may be configured to calculate a data configuration flow for the user device(s) based on the data transfer rule set. The system may include a quantum optimization engine configured for processing the data collected from a plurality of user devices. The quantum optimization engine may be further configured for calculating the data configuration flow for or from user devices. The data configuration flow may be an optimized organization of data to be transferred over one or more data channels from the devices and gateway of the edge layer to the platform layer. The quantum optimization engine may receive the initial data transfer rule set along with the data itself and process this information to determine an optimal flow of data from the devices. The quantum optimization engine may be configured to utilize one or more quantum algorithms to determine a configuration based on the input. Non-limiting examples of quantum algorithms utilized by the system include Fourier transform-based algorithms, amplitude amplification-based algorithms, quantum walk-based algorithms, and the like. The system may be configured to employ a hybrid quantum/classical algorithm.

In some aspects, the system may be configured to execute the data configuration flow to control a flow of the data transferred from the device gateway to an application server in a platform layer. The system may be configured to output the calculated data configuration flow from the quantum optimization engine to a data flow orchestration engine. The data flow orchestration engine may be configured to execute the data configuration flow by applying the configuration to the available data channels to control the flow of data to an application server in the platform layer or cloud.

In some aspects, the system may be configured to group data points based on the data transfer rule set and the data configuration flow, wherein the data from the grouped user devices is transferred to the application server together. In other aspects, the system may be configured to transmit a portion of data (e.g., high priority data) and not transmit another portion of data (e.g., lower priority data), where the data that is not transmitted is instead temporarily cached for later processing or transmission. In this way, the system intelligently optimizes which data is transferred over the network for additional processing in the platform layer and which data is cached for offline processing to save data transfer cost and processing power of the application server.

As will be appreciated by one of ordinary skill in the art, the present invention may be embodied as an apparatus (including, for example, a system, a machine, a device, a computer program product, and/or the like), as a method (including, for example, a process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function. As such, once the software and/or hardware of the claimed invention is implemented the computer device and application-specific circuits associated therewith are deemed specialized computer devices capable of improving technology associated with intelligently controlling data transfers between network connected devices and a platform layer application server.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for intelligently controlling data transfers between network connected devices and a platform layer application server, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

In some aspects of the described methods and systems, a regulated machine learning (ML) model is utilized. The regulated ML model is designed to make incremental learning adjustments in tandem with the determinations made by the machine learning engine and communicated to the regulated ML model. The machine learning engine accesses data outputted from test transfers using the draft rules, and it is trained to use data from the test transfers to collectively formulate and approve incremental learning adjustments with the regulated ML model. The regulated ML model and the machine learning engine may consider input data patterns, output data patterns, thresholds for model performance, and/or distributions of identified patterns between different ML models, One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, methods, systems, apparatuses, and computer program products may improve and optimize data rules, such as data transfer rules. Persons skilled in the art will appreciate that the present invention can be practiced by other than the described embodiments, which are presented for purposes of illustration rather than of limitation.

What is claimed is:

1. A method for facilitating a transfer of a newly received dataset across a data network having access to a searchable global dataset, the method utilizing a computer processor and one or more non-transitory computer-readable media storing computer-executable instructions, wherein the instructions, when executed by the computer processor, automatically generate data rules for said newly received dataset, the method comprising the steps of:
    said computer processor querying said global dataset to identify an existing dataset having one or more data patterns similar to said newly received dataset, wherein the existing dataset is a dataset that references a same entity that is contained within the newly received dataset and contains data fields different from the data fields contained within the newly received dataset;
    said computer processor identifying historical data rules used for a set of data transfers relating to said existing dataset; and
    a machine learning engine using said historical data rules to optimize data rules for use with a data transfer relating to said newly received dataset, thereby facilitating the transfer of said newly received dataset, wherein the machine learning engine is a quantum optimization engine configured to utilize one or more quantum algorithms to process an initial data transfer rule set from the existing dataset to process the newly received data, and further optimize the data rules using the newly received data;
    wherein said machine learning engine comprises a modality selected from a group consisting of natural language processing, a trained neural network model, a deep learning model, a supervised machine learning model, and an artificial intelligence model; and
    said machine learning engine is a different learning engine from a learning engine used to generate the data rules.

2. The method of claim 1, wherein said machine learning engine utilizes said historical data rules as an initial set of data rules and subsequently tunes said initial set of data rules using said newly received dataset.

3. The method of claim 1, wherein said machine learning engine utilizes said newly received dataset to generate an initial set of data rules and subsequently tunes said initial set of data rules using said historical data rules.

4. The method of claim 1, wherein said computer processor utilizes a machine learning engine.

5. The method of claim 1, wherein said data rules are used to evaluate quality of said newly received dataset.

6. The method of claim 1, wherein said data rules are used to prioritize transmission of datapoints of said newly received dataset.

7. A method for facilitating a transfer of a newly received dataset across a data network having access to a searchable global dataset, the method utilizing a computer processor and one or more non-transitory computer-readable media storing computer executable instructions, the instructions when executed by the computer processor, automatically generate data rules for said newly received dataset, the method comprising the steps of:
- said computer processor querying said global dataset to identify an existing dataset having data points overlapping with said newly received dataset, wherein the existing dataset is a dataset that references a same entity that is contained within the newly received dataset and contains data fields different from the data fields contained within the newly received dataset;
- said computer processor identifying historical data rules used for a set of data transfers relating to said existing dataset; and
- a machine learning engine using said historical data rules to optimize data rules for use with a data transfer relating to said newly received dataset, thereby facilitating the transfer of said newly received dataset, wherein the machine learning engine is a quantum optimization engine configured to utilize one or more quantum algorithms to process an initial data transfer rule set from the existing dataset to process the newly received data, and further optimize the data rules using the newly received data;
- wherein said machine learning engine comprises a modality selected from a group consisting of natural language processing, a trained neural network model, a deep learning model, a supervised machine learning model, and an artificial intelligence model; and
- said machine learning engine is a different learning engine from a learning engine used to generate the data rules.

8. The method of claim 7, wherein said machine learning engine utilizes said historical data rules as an initial set of data rules and subsequently tunes said initial set of data rules using said newly received dataset.

9. The method of claim 7, wherein said machine learning engine utilizes said newly received dataset to generate an initial set of data rules and subsequently tunes said initial set of data rules using said historical data rules.

10. The method of claim 7, wherein said computer processor utilizes a machine learning engine.

11. The method of claim 7, wherein said data rules are used to evaluate quality of said newly received dataset.

12. The method of claim 7, wherein said data rules are used to prioritize transmission of datapoints of said newly received dataset.

13. A method for facilitating a transfer of a newly received dataset across a data network having access to a searchable global dataset, the method utilizing a computer processor and one or more non-transitory computer-readable media storing computer executable instructions, the instructions, when executed by the computer processor, automatically generate data rules for said newly received dataset, the method comprising the steps of:
- querying said global dataset to identify an existing dataset corresponding with said newly received dataset, wherein the existing dataset is a dataset that references a same entity that is contained within the newly received dataset and contains data fields different from the data fields contained within the newly received dataset;
- determining whether said existing dataset comprises at least one existing data point that matches with a corresponding data point in said newly received dataset; and
- deprioritizing transfer of said corresponding data point in said newly received dataset, thereby facilitating the transfer of said newly received dataset;
- wherein said computer processor utilizes a machine learning engine, and wherein the machine learning engine is a quantum optimization engine configured to utilize one or more quantum algorithms to process an initial data transfer rule set from the existing dataset to process the newly received data, and optimize the data rules using the newly received data; and
- wherein said machine learning engine comprises a modality selected from a group consisting of natural language processing, a trained neural network model, a deep learning model, a supervised machine learning model, and an artificial intelligence model; and
- said machine learning engine is a different learning engine from a learning engine used to generate the data rules.

14. The method of claim 13, further comprising the steps of:
- identifying novel data points in said newly received dataset, meaning data points that lack corresponding data points in said global dataset; and
- merging said novel data points with said existing dataset, thereby generating a merged dataset.

15. The method of claim 14, further comprising using historical data rules previously used for said existing dataset to assist a machine learning engine in generating updated data rules for use with said merged dataset.

\* \* \* \* \*